United States Patent
Fly et al.

(10) Patent No.: US 8,100,010 B2
(45) Date of Patent: Jan. 24, 2012

(54) METHOD AND SYSTEM FOR FORMING AN ELECTRONIC ASSEMBLY HAVING INERTIAL SENSORS MOUNTED THERETO

(75) Inventors: Brian E. Fly, Clearwater, FL (US); Dave Moya, Oldsmar, FL (US)

(73) Assignee: Honeywell International Inc., Morristown, NJ (US)

( * ) Notice: Subject to any disclaimer, the term of this patent is extended or adjusted under 35 U.S.C. 154(b) by 910 days.

(21) Appl. No.: 12/102,508

(22) Filed: Apr. 14, 2008

(65) Prior Publication Data

US 2009/0255335 A1 Oct. 15, 2009

(51) Int. Cl.
*G01P 1/02* (2006.01)

(52) U.S. Cl. ............................................. 73/493; 73/510

(58) Field of Classification Search .................... 73/493, 73/504.04, 504.12, 510, 514.01, 514.35
See application file for complete search history.

(56) References Cited

U.S. PATENT DOCUMENTS

| | | | |
|---|---|---|---|
| 5,535,626 A * | 7/1996 | Bullis et al. ................. | 73/514.32 |
| 5,581,032 A * | 12/1996 | Uemura et al. ................ | 73/493 |
| 6,918,297 B2 | 7/2005 | MacGugan | |
| 7,040,922 B2 * | 5/2006 | Harney et al. ................. | 439/527 |
| 7,237,437 B1 * | 7/2007 | Fedora ............................ | 73/510 |
| 7,467,552 B2 * | 12/2008 | MacGugan .................... | 73/493 |
| 2006/0175938 A1 * | 8/2006 | Imamura et al. .............. | 310/348 |
| 2006/0176166 A1 | 8/2006 | Smith et al. | |
| 2007/0032951 A1 | 2/2007 | Tanenhaus et al. | |

FOREIGN PATENT DOCUMENTS

| | | |
|---|---|---|
| JP | 2002365095 A | 12/2002 |
| JP | 2003028646 A | 1/2003 |
| JP | 2006214898 A | 8/2006 |
| JP | 2007113919 A | 5/2007 |
| JP | 2007132887 A | 5/2007 |

OTHER PUBLICATIONS

International Search Report for PCT/US2009/039576 mailed Nov. 24, 2009.

* cited by examiner

*Primary Examiner* — John Chapman, Jr.
(74) *Attorney, Agent, or Firm* — Ingrassia Fisher & Lorenz, P.C.

(57) ABSTRACT

Systems and methods for forming an electronic assembly are provided. A first inertial sensor having a first sense axis is attached to a bracket. A second inertial sensor having a second sense axis is attached to the bracket such that the second sense axis is substantially orthogonal to the first sense axis. The bracket is attached to a circuit board having at least one microelectronic device mounted thereto.

3 Claims, 10 Drawing Sheets

METHOD AND SYSTEM FOR FORMING AN ELECTRONIC ASSEMBLY HAVING INERTIAL SENSORS MOUNTED THERETO

TECHNICAL FIELD

The present invention generally relates to electronic assemblies, such as inertial measurement units (IMUs), and more particularly relates to a method and system for forming an electronic assembly having multiple inertial sensors mounted thereto.

BACKGROUND

Inertial sensors, such as micro-electromechanical system (MEMS) devices, are used to detect motion in a wide variety of modern machinery, including various types of land vehicles, aircraft, and watercraft. Such vehicles often include subsystems known as "inertial measurement units" (IMUs) which contain the inertial sensors themselves, along with the various electronic components, often mounted to a circuit board, used to analyze the signals generated by the inertial sensors and interface with other electrical systems in the vehicles.

Typically, IMUs include MEMS inertial sensors arranged to detect the motion of the vehicle relative to three mutually orthogonal axes (i.e., x-, y-, and z-axes). As such, in order to work properly, the MEMS devices are generally arranged such that the "sense axis" (i.e., the axis relative to which motion is detected) of each is orthogonal to the sense axes of the other similar MEMS devices.

The installation of the MEMS devices in IMUs conventionally involves mounting the MEMS devices directly to the circuit board with little regard for the exact arrangement of the sense axes of the devices except in a general sense. After the IMUs have been assembled, the mounting of the MEMS devices often requires substantial adjustments (e.g., typically through software and precision rate table use) to ensure the orthogonal arrangement of the sense axes. These adjustments may be very time consuming and significantly increase the overall manufacturing costs of the IMUs.

Accordingly, it is desirable to provide a method and system for mounting inertial sensors in IMUs that facilitates the proper installation of the inertial sensors such that the sense axes are property arranged. Furthermore, other desirable features and characteristics of the present invention will become apparent from the subsequent detailed description of the invention and the appended claims, taken in conjunction with the accompanying drawings and this background of the invention.

BRIEF SUMMARY

A method for forming an electronic assembly is provided. A first inertial sensor having a first sense axis is attached to a bracket. A second inertial sensor having a second sense axis is attached to the bracket such that the second sense axis is substantially orthogonal to the first sense axis. The bracket is attached to a circuit board having at least one microelectronic device mounted thereto.

A method for constructing an inertial measurement unit is provided. First, second, and third micro-electromechanical system (MEMS) inertial sensors, having respective first, second, and third sense axes, are attached to a bracket such that the first, second, and third sense axes are substantially orthogonal. Fourth, fifth, and sixth MEMS inertial sensors, having respective fourth, fifth, and sixth sense axes, are attached to the bracket such that the fourth, fifth, and sixth sense axes are substantially parallel to the respective first, second, and third sense axes. The bracket is attached to a circuit board having at least one integrated circuit mounted thereto such that the first, second, third, fourth, fifth, and sixth MEMS inertial sensors are in operable communication with the at least one integrated circuit.

An inertial measurement unit is provided. The inertial measurement unit includes a circuit board, a plurality of conductive traces formed on the circuit board, an integrated circuit mounted to the circuit board and electrically connected to the conductive traces, and a sensor assembly. The sensor assembly includes a bracket connected to the circuit board. A first MEMS inertial sensor is connected to the bracket and has a first sense axis. A second MEMS inertial sensor is connected to the bracket and has a second sense axis. The second sense axis is substantially orthogonal to the first sense axis. A plurality of conductive leads are electrically connected to the first and second MEMS inertial sensors and the conductive traces such that the first and second MEMS inertial sensors are in operable communication with the integrated circuit through the conductive traces.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should be appreciated that the particular implementations shown and described herein are illustrative of the invention and its best mode and are not intended to otherwise limit the scope of the invention in any way. It should also be understood that FIGS. 1-8 are merely illustrative and may not be drawn to scale. Further, in several of the drawings, a Cartesian coordinate system, including x, y, and z axes and/or directions, is shown to clarify the relative orientation of the components, according to the various embodiments. However, this coordinate system is only intended to assist in the explanation of various aspects of the present invention and should be not construed as limiting.

FIG. 1 to FIG. 8 illustrate methods and systems for forming an electronic assembly, such as an inertial measurement unit (IMU). A first inertial sensor having a first sense axis is attached to a bracket. A second inertial sensor having a second sense axis is attached to the bracket such that the second sense axis is substantially orthogonal to the first sense axis. The bracket is attached to a circuit board having at least one microelectronic device mounted thereto.

A third inertial sensor having a third sense axis may also be attached to the bracket such that the third sense axis is substantially orthogonal to the first and second sense axes. The attachment of the first, second, and third inertial sensors may occur before the attachment of the bracket to the circuit board. The first, second, and third inertial sensors may be microelectromechanical system (MEMS) devices, such as MEMS gyroscopes or MEMS accelerometers.

In an embodiment in which the first, second, and third inertial sensors are MEMS gyroscopes, fourth, fifth, and sixth inertial sensors, such as MEMS accelerometers may be attached to the bracket such that the sense axes thereof are mutually orthogonal.

Figure 1:
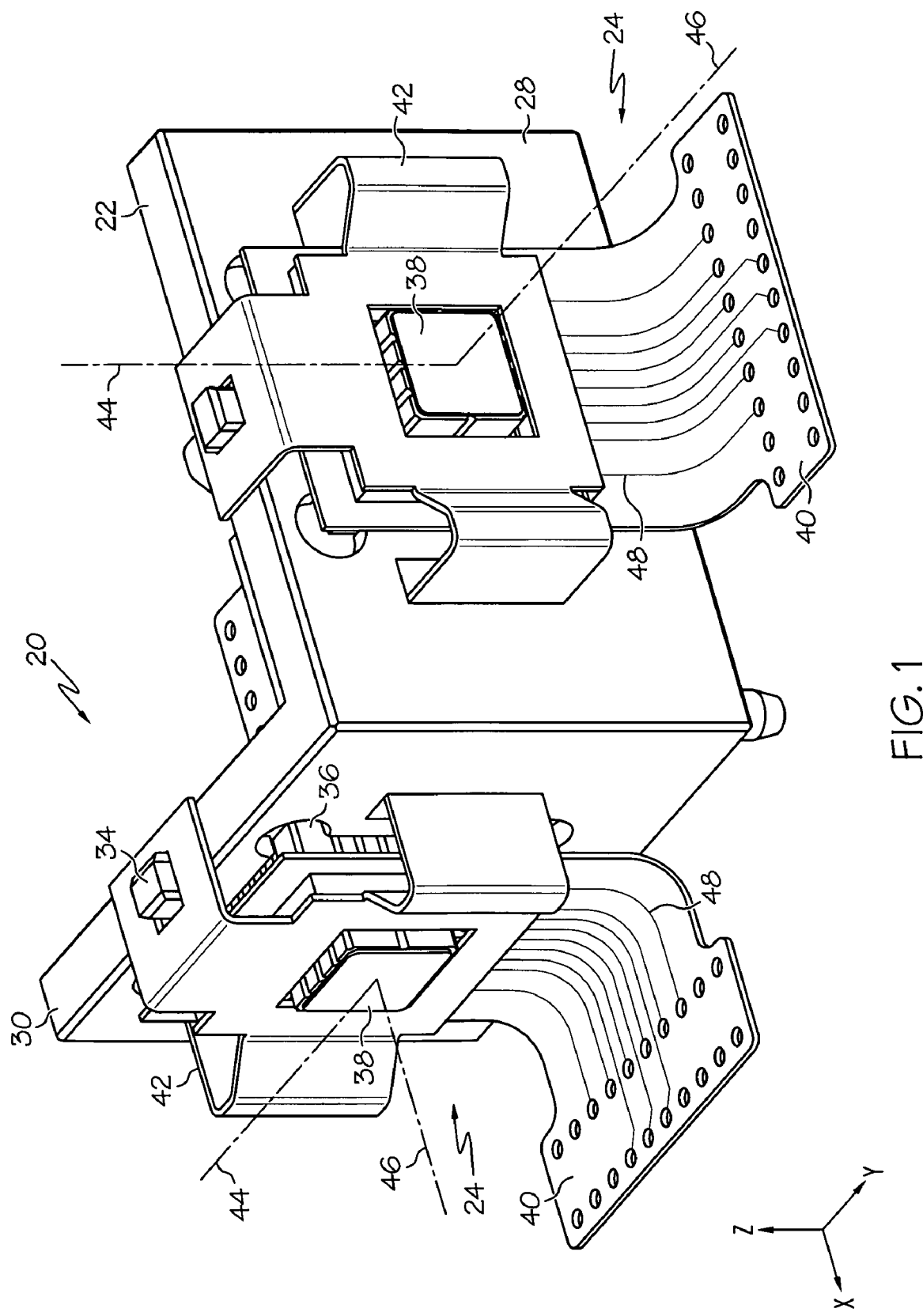
FIGS. 1 and 2 are isometric views of an inertial sensor assembly according to one embodiment of the present invention.
Figure 2:
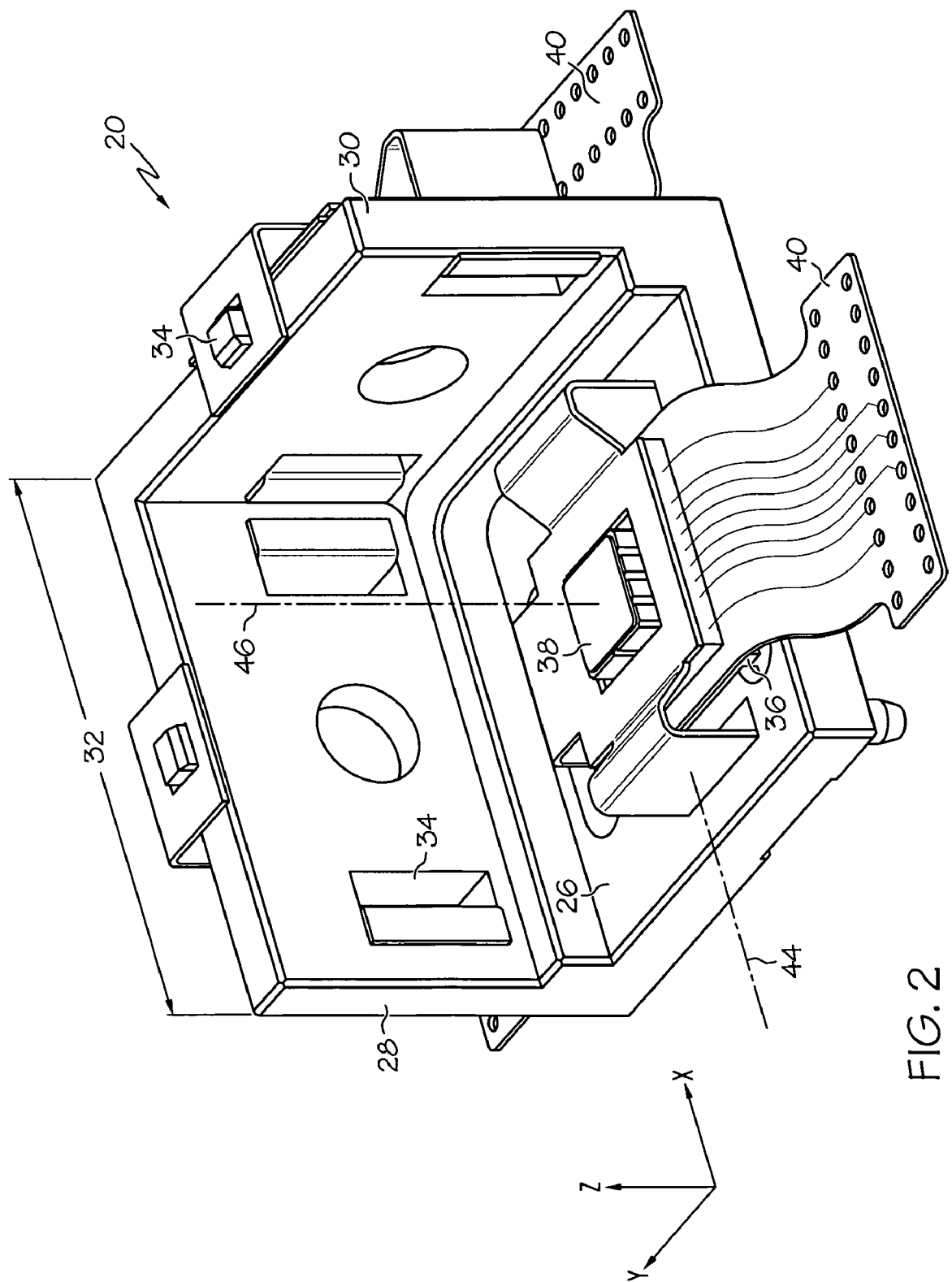

FIGS. 1 and 2 illustrate an inertial sensor assembly 20, according to one embodiment of the present invention. The sensor assembly 20 includes a right angle bracket 22 and three sensor sub-assemblies 24. The bracket 22 is essentially "corner-cube" shaped and includes a bottom plate (or side) 26 and two side plates 28 and 30. Each of the plates (or sides) 26, 28, and 30 are substantially square with a side length 32 of, for example, approximately 2 inches (although smaller plates may also be used). Together, the sides 28 and 30 and the bottom side 26 form a right angle mount in which the bottom plate 26 and the side plates 28 and 30 are substantially orthogonal. Each of the sides 26, 28, and 30 include multiple attachment formations 34, such as openings and protrusions. In one embodiment, the bracket 22 is a molded piece of plastic, polymer resin, ceramic, or composite material.

Each of the sensor sub-assemblies 24 includes a first inertial sensor 36, a second inertial sensor 38, a flex-tape portion (or piece) 40, and mounting a clip 42. As shown, each of the sensor sub-assemblies 24 is mounted to a respective one of the plates 26, 28, and 30 of the bracket 22, with the one of the sub-assemblies 24 being placed on an upper side of the bottom plate 26, and the others being mounted to the outer sides of the side plates 28 and 30. Within each of the sub-assemblies 24, the clip 42 mates with the attachment formations 34 on the bracket 22 to secure the inertial sensors 36 and 38 and the flex-tape portions 40 to the bracket 22.

Although not specifically shown in FIGS. 1 and 2, the first inertial sensors 36 are located between the plates 26, 28, or 30 and the second inertial sensors 38, respectively. The flex-tape portions 40 are between and adjacent to the respective first and second inertial sensors 36. The first inertial sensors 36 each have a first sense axis 44, and the second inertial sensors 38 each have a second sense axis 46. In one embodiment, the first inertial sensors 36 are MEMS gyroscopes, and the second inertial sensors 38 are MEMS accelerometers. Although not specifically shown, the first and second inertial sensors 36 may be encased in sealed packages, as is commonly understood.

As shown in FIGS. 1 and 2, the inertial sensors 36 and 38 are arranged such that the first sensor axes 44 are mutually orthogonal and the second sensor axes 46 are mutually orthogonal. More specifically, the sense axis 44 of the first inertial sensor 36 connected to the bottom plate 26 is substantially parallel to the x-axis. Similarly, the sense axis 44 of the first inertial sensors 36 connected to side plate 30 is substantially parallel to the y-axis, and the sense axis 44 of the first inertial sensor 36 connected to side plate 28 is substantially parallel to the z-axis.

Likewise, the second sensor axis 46 of the second inertial sensor 38 connected to the bottom plate 26 is substantially parallel to the z-axis. The sense axis 46 of the second inertial sensor 48 connected to side plate 30 is substantially parallel to the x-axis, and the second sensor axis 46 of the second inertial sensor connected to side plate 28 is substantially parallel to the y-axis.

Although not specifically shown, each portion of flex-tape 40 has a width similar to a width of the first inertial sensors 36 and includes a plurality of conductive leads or traces 48 embedded therein, as is commonly understood. The conductive traces 48 within the flex-tape portions 40 are electrically connected to both the first and second inertial sensors 36 and 38 within the respective sensor sub-assemblies 24. The flex-tape portions 40 may substantially be composed of a flexible, insulating material, such as polyamide. In one embodiment, the sensor sub-assemblies 24 are connected to the bracket 22 as shown in FIGS. 1 and 2 before being installed onto a circuit board, as is described below.

Figure 3:
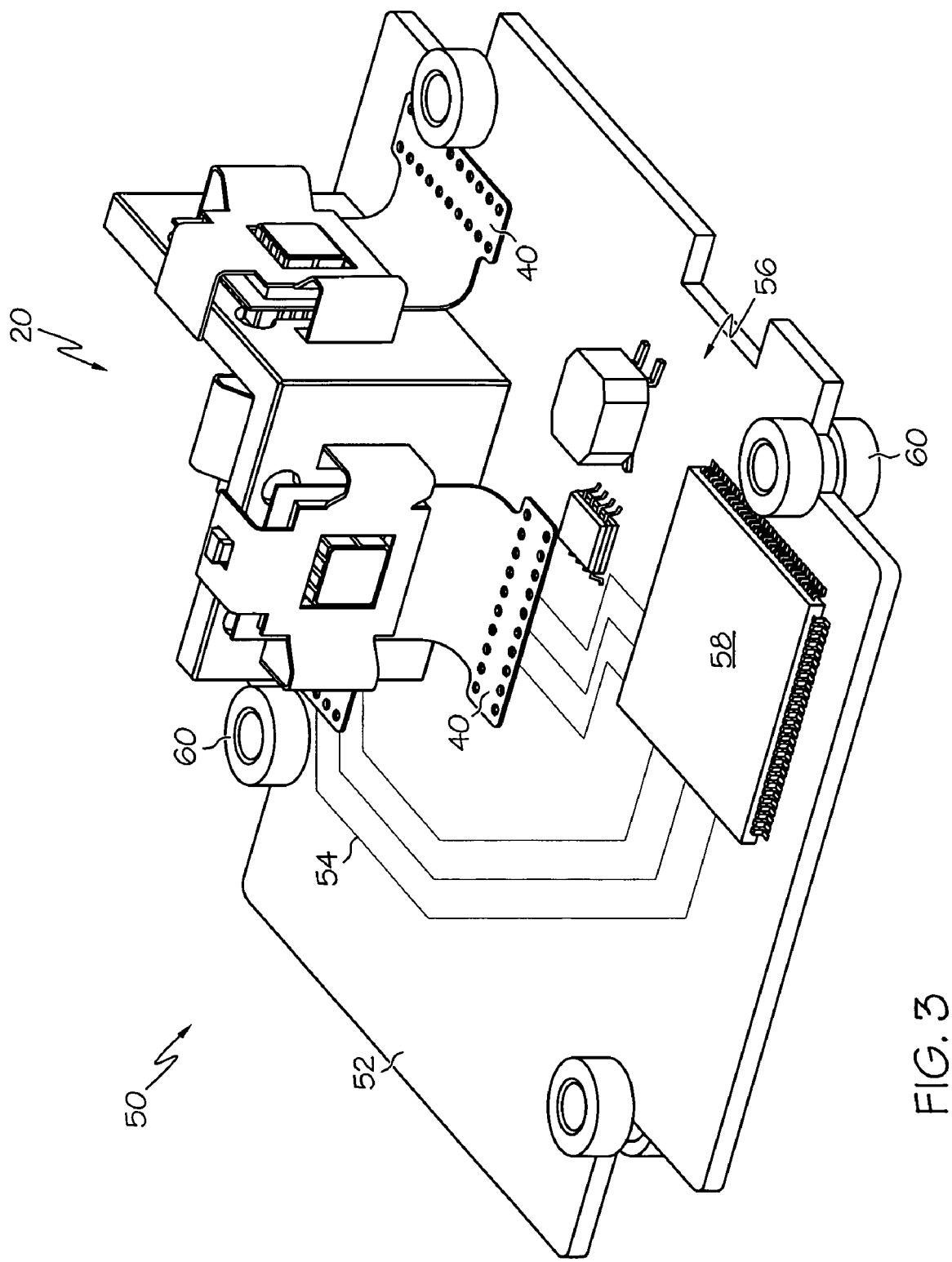
FIG. 3 is an isometric view of an inertial measurement unit printed wire board (PWB) including the inertial sensor assembly of FIGS. 1 and 2.

FIG. 3 illustrates an inertial measurement unit (or system) (IMU) 50, according to one embodiment of the present invention. The IMU 50 includes a circuit board (or printed wiring board (PWB)) 52 and the sensor assembly 20 mounted to the circuit board 52. As is commonly understood, the circuit board 52 is composed substantially of a flat panel of an insulating material, such as a plastic, polymer resin, ceramic, or composite material. In one embodiment, the flat panel is made of the same material as the bracket 22, which provides for the bracket 22 and the circuit board 52 have matching coefficients of thermal expansion (CTE). The circuit board 52 is substantially square and also includes conductive traces 54, electronic components 56, including a microprocessor 58, and fasteners 60. The conductive traces 54 are formed on, or embedded within, the circuit board 52 and extend between the electronic components 56 and the sensor assembly 20. Although not shown, the IMU may also include a housing and an electrical connector.

The electronic components 56 are attached to the circuit board 52 using, for example, solder balls that electrically connect the microprocessor 58, and the other components 56, to first portions or ends of the conductive traces 54. The microprocessor 58 may include any one of numerous known general-purpose microprocessors (or an application specific processor) that operates in response to program instructions and a memory, which may be included within the electronic components 56. The memory may include random access memory (RAM) and/or read-only memory (ROM) that has instructions stored thereon (or on another computer-readable medium) for carrying out the processes and methods described below. It should be appreciated that the microprocessor 58 may be implemented using various other circuits besides a programmable processor. For example, digital logic circuits and analog signal processing circuits may also be used.

Although not shown in detail in FIG. 3, the conductive traces 54 extend across the circuit board 52 to the flex-tape portions 40 and are in electrical contact with the traces 48 in the flex-tape 40. As such, the first and second inertial sensors 36 and 38 shown in FIGS. 1 and 2 are in operable communication with the microprocessor 58 and the other electronic components 56.

During operation the IMU 50 is installed in, for example, a vehicle, such as an automobile or aircraft. As will be appreciated by one skilled in the art, the first and second inertial sensors 36 and 38 generate signals representative of various movements of the IMU 50, the sensor assembly 20, and/or the vehicle relative to the first and second sense axes 44 and 46 of the various inertial sensors 36 and 38. The microprocessor 58 receives the signals through the traces 54 and, for example, calculates the overall motion of the IMU 50 from the information received from all of the inertial sensors 36 and 38.

Figure 4:
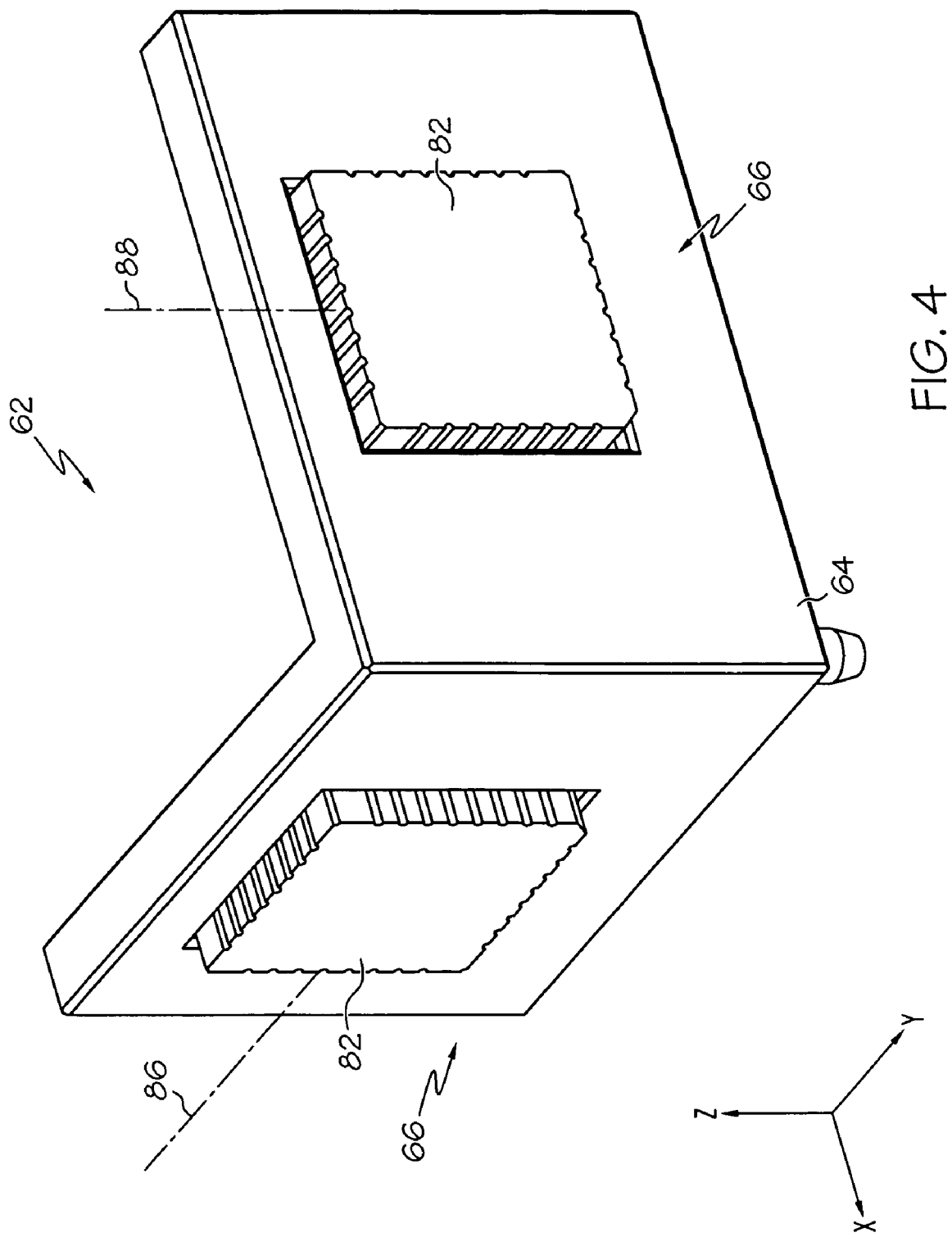
FIGS. 4 and 5 are isometric views of an inertial sensor assembly, according to another embodiment of the present invention.
Figure 5:
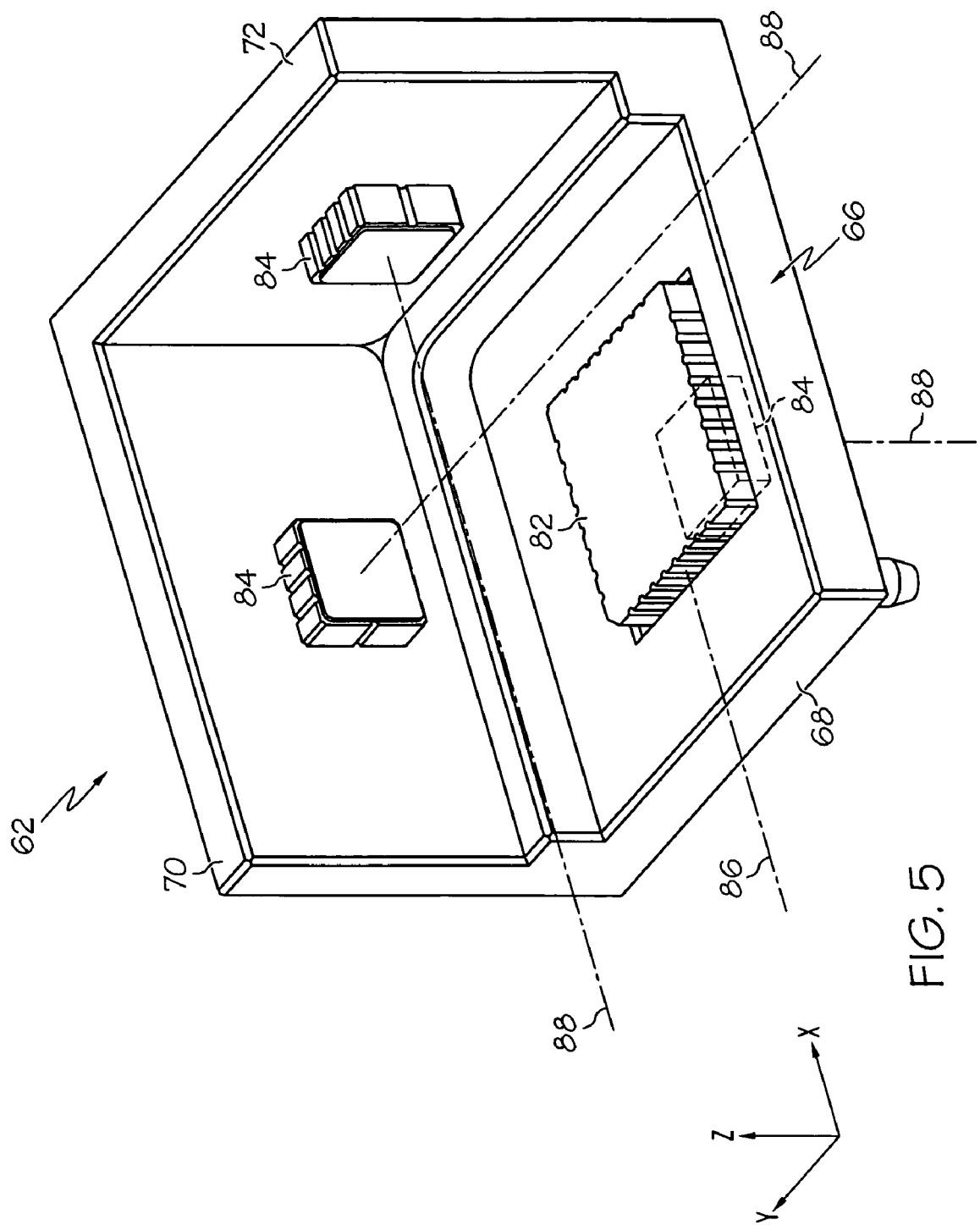

FIGS. 4 and 5 illustrate a sensor assembly 62, according to another embodiment of the present invention. The sensor assembly 62 includes a bracket 64 and three sensor sub-assemblies 66.

Figure 6:
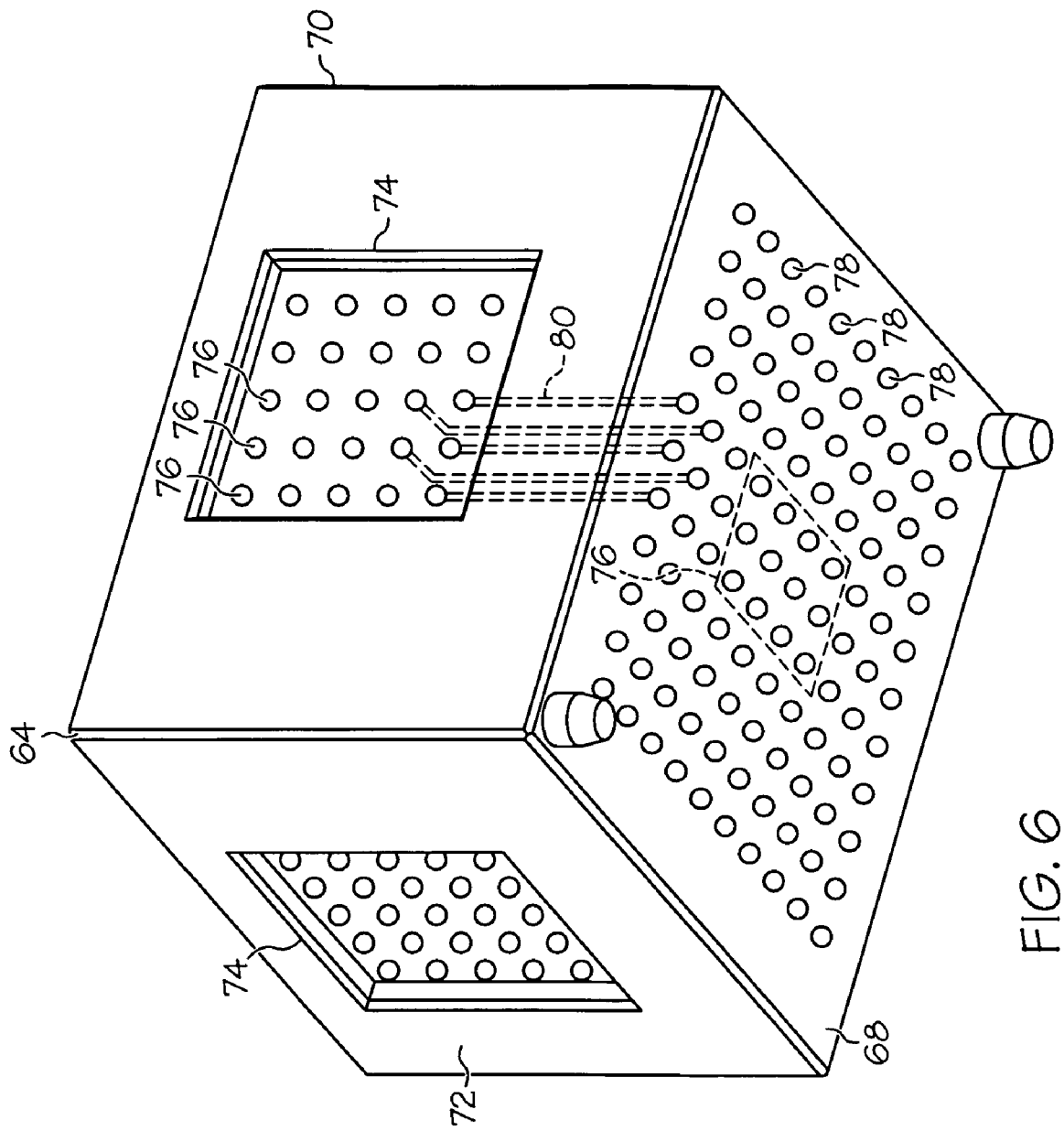
FIGS. 6 and 7 are isometric views of a bracket within the inertial sensor assembly of FIGS. 4 and 5.
Figure 7:
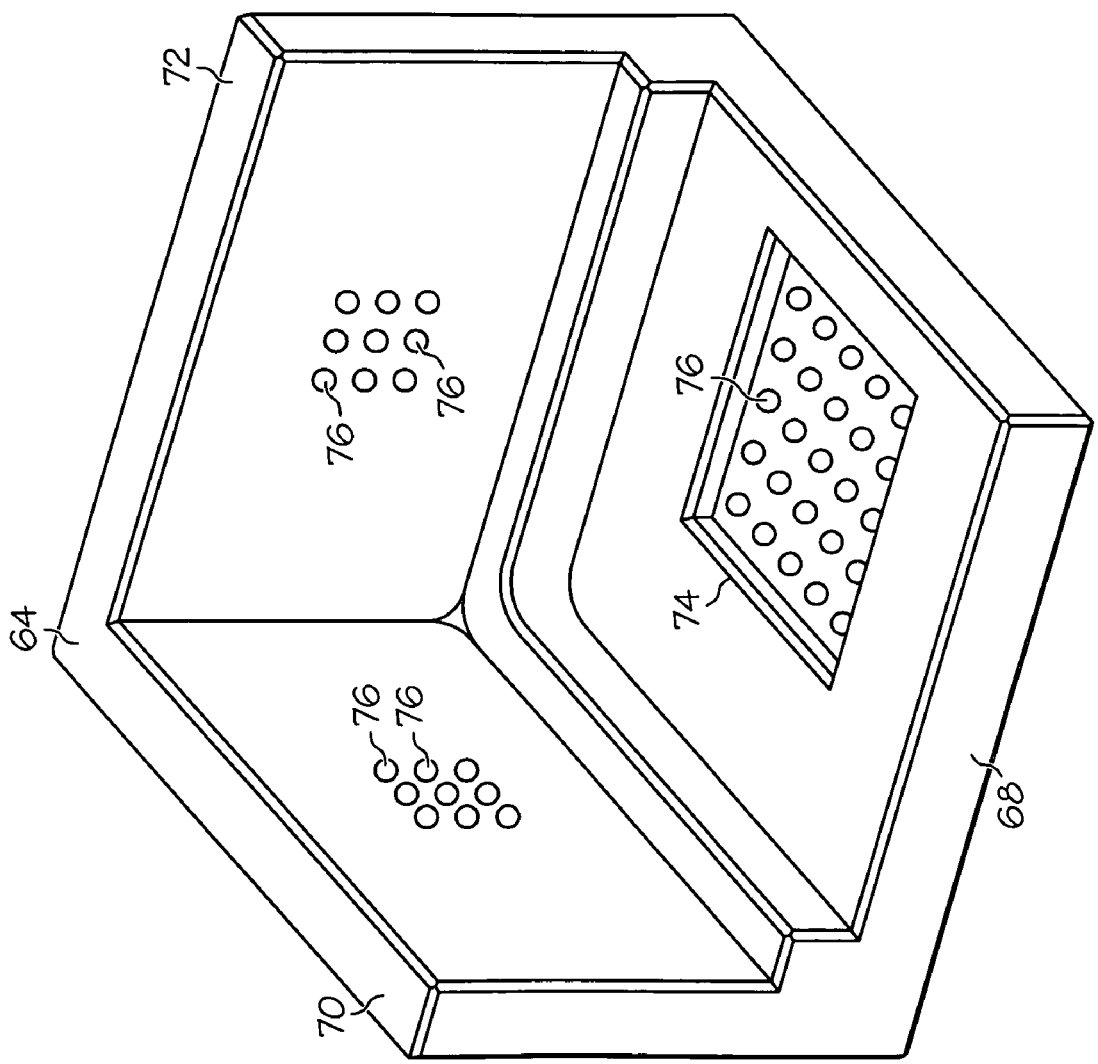
Figure 7:
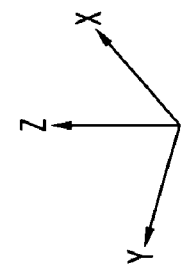

FIGS. 6 and 7 illustrate the bracket 64 with the sensor sub-assemblies 66 removed. Generally, the bracket 64 is shaped similar to the bracket 22 shown in FIGS. 1-3 and includes a bottom plate 68 and side plates 70 and 72 that are mutually orthogonal. Alignment depressions 74 are formed on of the top surface of the bottom plate 68 and on the outer surfaces of the side plates 70 and 72. A plurality of sensor contact formations 76, such as a solder balls, are located (or formed within) the alignment depressions 74 and at central portions of the opposing sides of the plates 68, 70, and 72. Referring specifically to FIG. 6, a plurality of circuit board contact formations 78 are located on outer portions the bottom surface of the bottom plate 68. Still referring to FIG. 6, the plates 68, 70, and 72 include a plurality of conductive traces (or leads) 80 that electrically interconnect each of the sensor contact formations 76 with a respective one of the circuit board contact formations 78 on the bottom surface of a bottom plate 68.

Referring again to FIGS. 4 and 5, the sensor sub-assemblies 66 each include a first inertial sensor 82 and a second inertial sensor 84, similar to those shown in FIGS. 1 and 2 and described above. Referring to FIGS. 4, 5, 6, and 7 in combination, the first inertial sensors 82 are positioned within the alignment depressions 74 on of the top surface of the bottom plate 68 and the outer surfaces of the side plates 70 and 72. The second inertial sensors 84 are respectively connected to the sensor contact formations 76 on the inner surfaces of the side plates 70 and 72 and on the bottom surface of the bottom plate 68. As is commonly understood, the first and second inertial sensors 82 and 84 may be attached to the bracket 64 by partially re-flowing the contact formations 76, as is commonly understood.

In a fashion similar to that described above, the first inertial sensors 82 have first sense axes 86, and the second inertial sensors 84 have second sense axes 88. As with the embodiment shown in FIGS. 1 and 2, the inertial sensors 82 and 84 are arranged such that the first sensor axes 86 are mutually orthogonal, as are the second sensor axes 88. More specifically, the sense axis 86 of the first inertial sensor 82 on the bottom plate 68 is substantially parallel to the x-axis. The sense axis 86 of the first inertial sensor 82 on side plate 70 is substantially parallel to the z-axis. The sense axis 86 of the first inertial sensor 82 on side plate 72 is substantially parallel to the y-axis.

Likewise, the sense axis 88 of the second inertial sensor 84 on the bottom plate 68 is substantially parallel to the z-axis. The sense axis 88 of the second inertial sensor 84 on side plate 70 is substantially parallel to the y-axis. The sense axis 88 of the second inertial sensor 84 on side plate 72 is substantially parallel to the x-axis.

Figure 8:
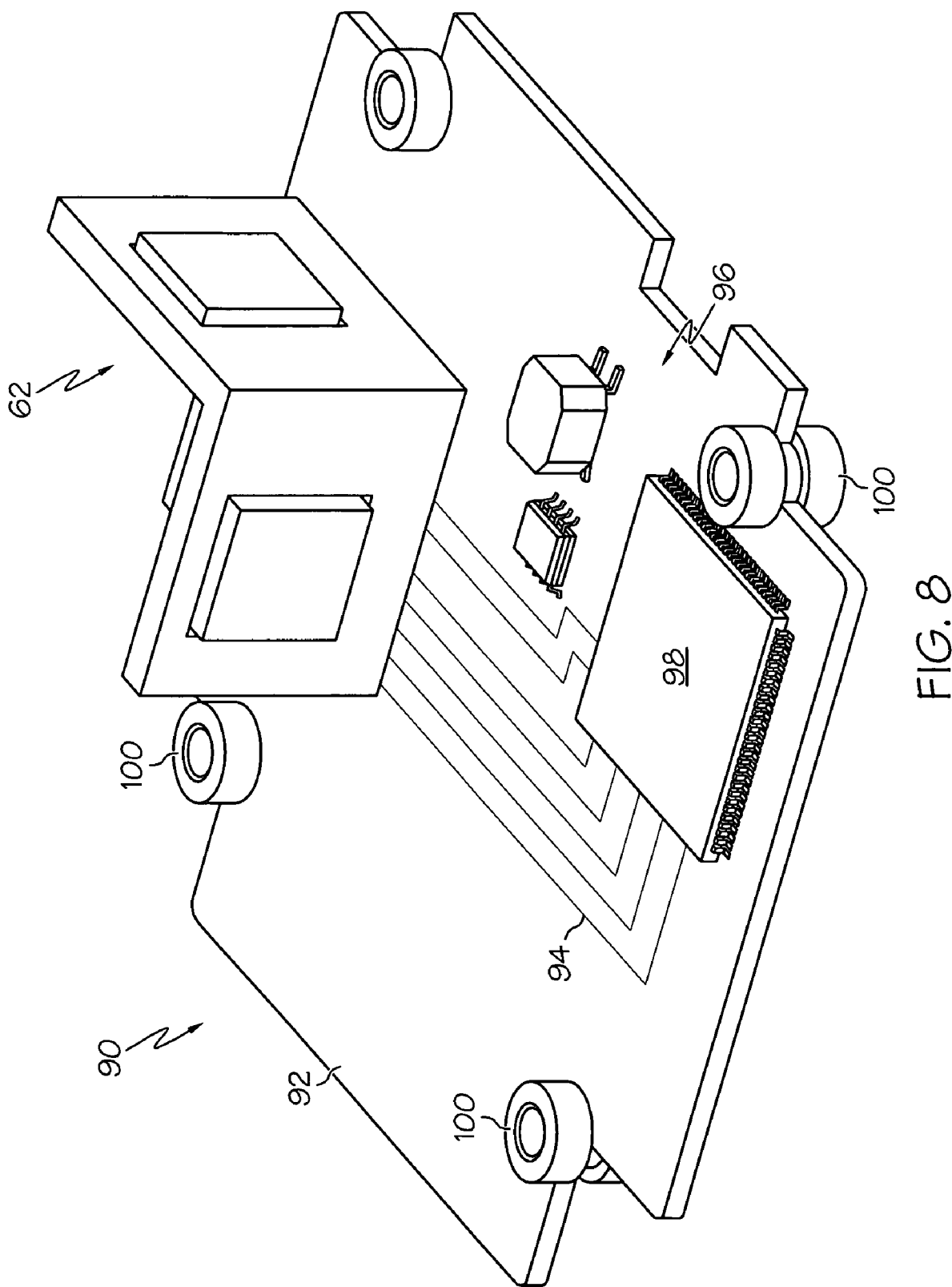
FIG. 8 is an isometric view of an inertial measurement unit PWB including the inertial sensor assembly of FIGS. 4 and 5.

FIG. 8 illustrates an IMU 90, according to another embodiment of the present invention. The IMU 90 includes a circuit board (or printed wiring board) 92 and the sensor assembly 62 of FIGS. 4 and 5 mounted to the circuit board 92. The circuit board 92 may be similar to that shown in FIG. 3 and likewise include conductive traces 94, electronic components 96 (including a microprocessor 98), and fasteners 100. The conductive traces 94 are formed on, or embedded within, the circuit board 92 and extend between the electronic components 96 and the sensor assembly 62. The electronic components 96 are attached to the circuit board 92 using, for example, solder balls that electrically connect the electronic components 56 to first portions or ends of the conductive traces 54. Although not shown in detail, the conductive traces 94 extend across the circuit board 92 to the sensor assembly 62 and are in electrical contact with the circuit board contact formations 78 shown in FIG. 6. As such, the first and second inertial sensors 82 and 84 shown in FIGS. 4 and 5 are in operable communication with the electronic components 96.

During operation the IMU 90 is installed in, for example, a vehicle, such as an automobile or aircraft. As will be appreciated by one skilled in the art, the first and second inertial sensors 82 and 84 generate signals representative of various movements of the sensor assembly 62 (or the vehicle) relative to the first and second sense axes 86 and 88 of the various inertial sensors 82 and 84. The microprocessor 58 receives the signals through the traces 94 and, for example, calculates the overall motion of the IMU 90 from the information received from all of the inertial sensors 82 and 84.

One advantage of the method and system described above is that proper alignment of the sense axes of the inertial sensors is facilitated. More specifically, because of the shape of the bracket, the sense axes of the inertial sensors are substantially orthogonal before being installed in the IMU (or attached to the circuit board). As a result, any adjustments made to the relative orientations of the inertial sensors after being installed in the IMU are minimized. Thus, the time required to complete the IMU is reduced, as is the overall manufacturing cost of the IMU. Another advantage is that the sensor assembly, in at least one embodiment, utilizes both gyroscopes and accelerometers, both of which are mounted to the bracket. Thus, the sensor assembly is capable of accurately detecting both rotations and accelerations relative to the sense axes.

Also, because of the simplified shape of the bracket (i.e., made of plates) the size and weight thereof are minimized, as are manufacturing costs. The use of sealed inertial sensors allows for the bracket to be used while still protecting the MEMS devices from environmental effects. An additional advantage of the embodiment shown in FIGS. 4-8 is that because of the contact formations on the bracket, the inertial sensors may be placed onto the bracket, and the bracket may be placed onto the circuit board, using standardized, automated "pick and place" machinery, as is commonly understood, which further reduces manufacturing costs and time.

Figure 9:
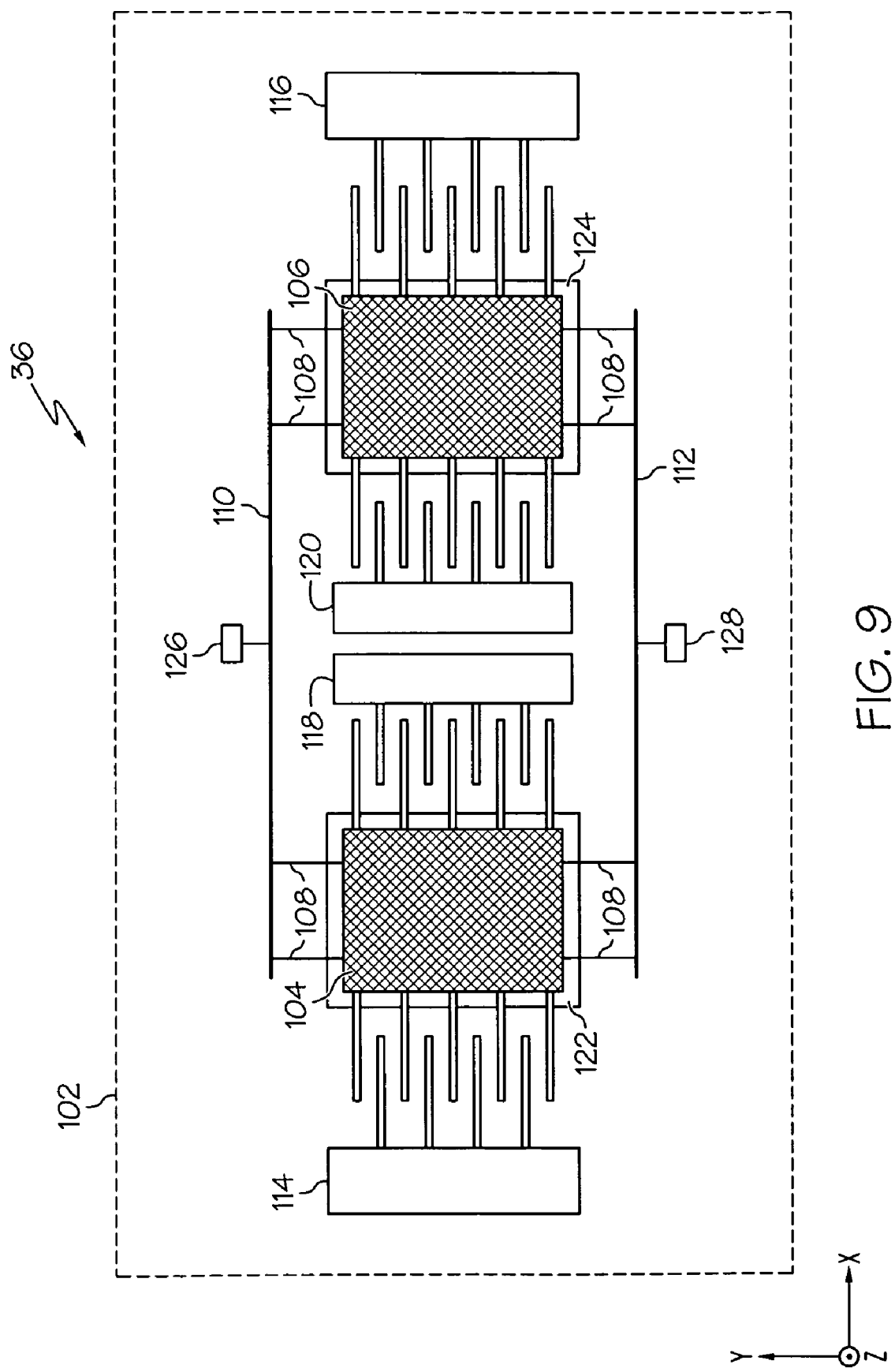
FIG. 9 is a plan view of an exemplary micro-electromechanical system (MEMS) gyroscope that may be used in the inertial sensor assemblies of FIGS. 1, 2, 4, and 5.

FIG. 9 illustrates the first inertial sensor 36 in FIGS. 1 and 2 (and/or the first inertial sensor 82 in FIGS. 4 and 5), according to one embodiment of the present invention. In one embodiment, the first inertial sensor 36 is a micro-electromechanical system (MEMS) gyroscope. While FIG. 8 shows the MEMS gyroscope as a tuning fork gyroscope, other MEMS vibratory gyroscopes that use a Coriolis acceleration to detect rotation, such as an angular rate sensing gyroscope, may also be used. The first inertial sensor 36 may be formed on a substrate 102 and may include proof masses 104 and 106, a plurality of (e.g., eight) support beams 108, cross beams 110 and 112, motor drive combs 114 and 116, motor pickoff combs 118 and 120, sense plates 122 and 124, and anchors 126 and 128.

The proof masses 104 and 106 may be any mass suitable for use in a MEMS gyroscope system. In a preferred embodiment, the proof masses 104 and 106 are silicon plates. Other materials that are compatible with micromachining techniques may also be employed. Although FIG. 8 shows two proof masses, other numbers of proof masses may be used. The proof masses 104 and 106 are located substantially between the motor drive combs 114 and 116 and the motor pickoff combs 118 and 120, respectively. The proof masses 104 and 106 include a plurality (e.g., ten) of comb-like electrodes extending towards the motor drive combs 114 and 116 and the motor pickoff combs 118 and 120. In one embodiment, the proof masses 104 and 106 are supported above the sense plates 122 and 124 by the support beams 108.

The support beams 108 may be micromachined from a silicon wafer and may act as springs allowing the proof masses 104 and 106 to move within the drive plane (e.g., the x-axis) and the sense plane (e.g., the z-axis). The support beams 108 are connected to the cross beams 110 and 112. The cross beam 110 and 112 are connected to the anchors 126 and 128, which are in turn connected to the substrate 102, thus providing support for the MEMS gyroscope.

The motor drive combs 114 and 116 include a plurality of comb-like electrodes extending towards the proof masses 104 and 106. The number of the electrodes on the motor drive combs 114 and 116 may be determined by the number of electrodes on the proof masses 104 and 106. The comb-like electrodes of the proof masses 104 and 106 and the motor drive combs 114 and 116 may jointly form capacitors. The motor drive combs 114 and 116 may be connected to drive electronics (not shown) that cause the proof masses 104 and 106 to oscillate along the drive plane by using the capacitors formed by the electrodes.

The motor pickoff combs 118 and 120 include a plurality of comb-like electrodes extending towards the proof masses 104 and 106. The number of the electrodes on the motor pickoff combs 118 and 120 may be determined by the number of electrodes on the proof masses 104 and 106. The comb-like electrodes of the proof masses 104 and 106 and the motor pickoff combs 118 and 120 may jointly form capacitors that allow the MEMS gyroscope to sense motion in the drive plane.

The sense plates 122 and 124 may form parallel capacitors with the proof masses 104 and 106. If an angular rate input is applied to the MEMS gyroscope about the y-axis while the proof masses 104 and 106 are oscillating along the x-axis, a Coriolis force may be detected as a displacement or motion in the z-axis by the parallel capacitors. The output of the MEMS gyroscope may be a signal proportional to the change in capacitance. The signal may be a current if a sense bias voltage is applied to the sense plates 122 and 124. The sense plates 122 and 124 may be connected to the sense electronics that detect the change in capacitance as the proof masses 104 and 106 move towards and/or away from the sense plates 122 and 124.

Figure 10:
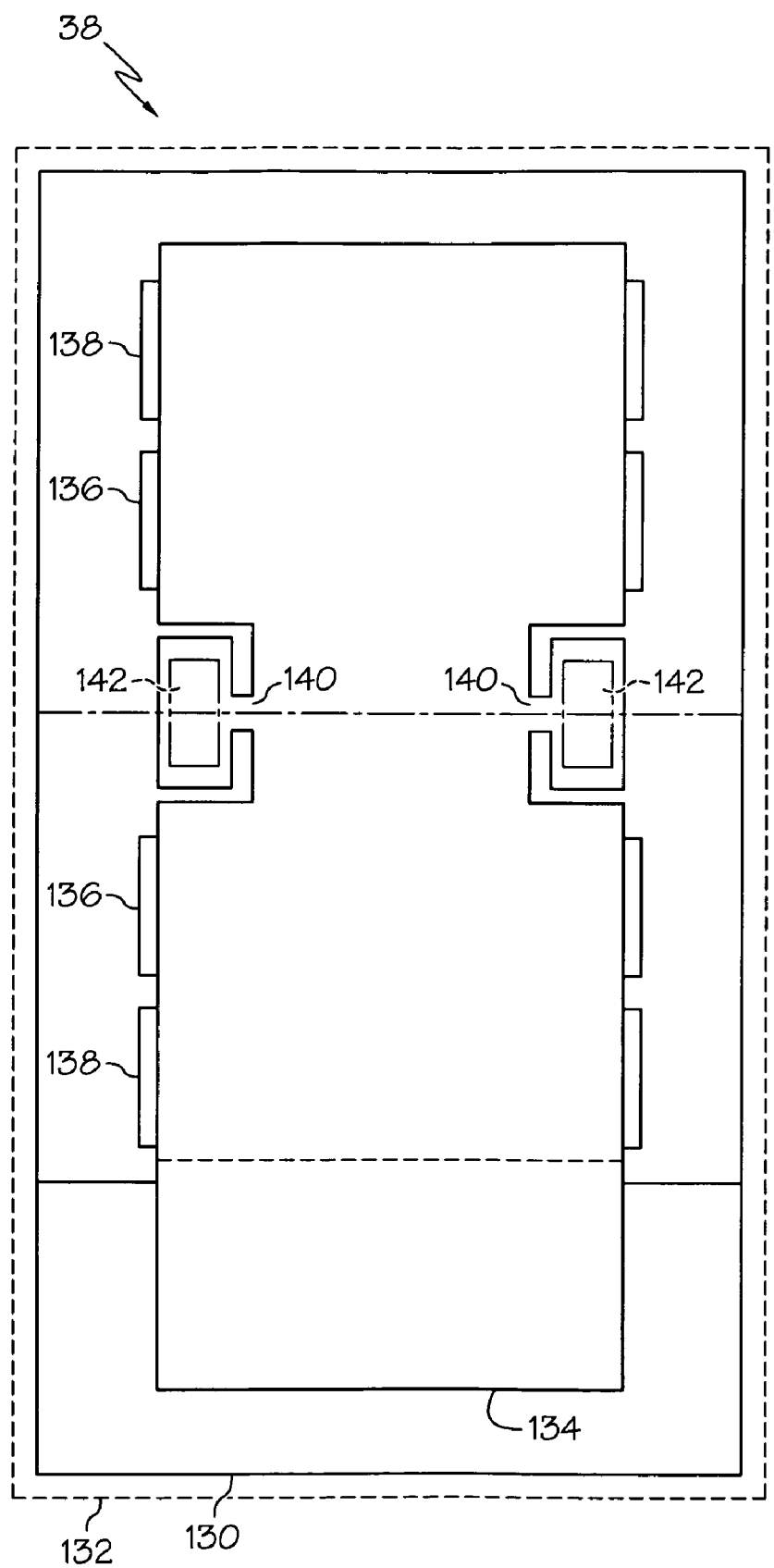
FIG. 10 is a plan view of an exemplary MEMS accelerometer that may be used in the inertial sensor assemblies of FIGS. 1, 2, 4, and 5.

FIG. 10 illustrates the second inertial sensor 38 in FIGS. 1 and 2 (and/or the second inertial sensor 84 in FIGS. 4 and 5), according to one embodiment of the present invention. In one embodiment, the second inertial sensor 84 is a MEMS accelerometer, in particular, a capacitive pick-off sensor constructed as a conventional mid-pendulum hinged or "teeter-totter" type accelerometer. The accelerometer includes a pair of stationary substrates 130 and 132 (substrate 132 is shown transparently) and a pendulous acceleration sensing element 134, commonly referred to as either a "pendulum" or a "proof mass."

The substrates 130 and 132 are spaced from one another and each has a number of metal electrode layers 136 and 138 of predetermined configuration deposited on one surface to form respective capacitor electrodes or "plates." This is an example of multiple stacked plates. One of electrode elements operates as excitation electrode to receive stimulating signals, and the other electrode element operates as a feedback electrode for electrostatic rebalance. A single set of electrode elements operates as both excitation and feedback electrodes when the feedback signal is superimposed on the excitation signal.

The pendulous acceleration sensing element 134 is flexibly suspended between the substrates 130 and 132 by one or more rotational flexures 140 situated at elevated attachment points 142 for pendulous rotation about a fulcrum or hinge axis h to form different sets of capacitors with electrode elements 136 and 138. Movement of the acceleration sensing element 134 in response changes in its position relative to the stationary excitation electrodes 136 and 138 cause a change in pick-off capacitance. This change in pick-off capacitance is indicative of acceleration.

In such an acceleration sensor device, a capacitance formed by the excitation electrodes 136 (or 138) and the moveable sensing element 134 is inversely proportional to the distance between the electrodes 136 and 138 and the pendulous acceleration sensing element 134 when constructed on the elevated attachment points 142.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An inertial measurement unit comprising:
a circuit board;
a plurality of conductive traces formed on the circuit board;
an integrated circuit mounted to the circuit board and electrically connected to the conductive traces; and
a sensor assembly comprising:
  a bracket connected to the circuit board, the bracket including a first side plate, a second side plate, and a third side plate, the first, second, and third side plates orthogonally disposed and coupled to each other, the first, second, and third side plates each having an outer side and an inner side;
  a first sensor-subassembly mounted to the outer side of the first side plate, the first sensor-subassembly comprising a first inertial sensor having a first sense axis and a second inertial sensor having a second sense axis that is orthogonal to the first sense axis;
  a second sensor-subassembly mounted to the outer side of the second side plate, the second sensor-subassembly comprising a third inertial sensor having a third sense axis and a fourth inertial sensor having a fourth sense axis that is orthogonal to the third sense axis;
  a third sensor-subassembly mounted to the inner side of the third side plate, the third sensor-subassembly comprising a fifth inertial sensor having a fifth sense axis and a sixth inertial sensor having a sixth sense axis that is orthogonal to the fifth sense axis;

a first plurality of conductive leads electrically connected to the first and second inertial sensors and to a first plurality of the conductive traces such that the first and second inertial sensors are in operable communication with the integrated circuit;

a second plurality of conductive leads electrically connected to the third and fourth inertial sensors and to a second plurality of the conductive traces such that the third and fourth inertial sensors are in operable communication with the integrated circuit; and a third plurality of conductive leads electrically connected to the fifth and sixth inertial sensors and to a third plurality of the conductive traces such that the fifth and sixth inertial sensors are in operable communication with the integrated circuit, wherein the first, second, and third plurality of the conductive traces each have first portions adjacent the integrated circuit and second portions adjacent the bracket, and wherein the sensor assembly further comprises:

a first flex-tape having the first plurality of conductive leads embedded therein, the first flex-tape having a first portion coupled between the first and second inertial sensors and a second portion coupled to the second portions of the first plurality of conductive traces;

a second flex-tape having the second plurality of conductive leads embedded therein, the second flex-tape having a first portion coupled between the third and fourth inertial sensors and a second portion coupled to the second portions of the second plurality of conductive traces; and a third flex-tape having the third plurality of conductive leads embedded therein, the third flex-tape having a first portion coupled between the fifth and sixth inertial sensors and a second portion coupled to the second portions of the third plurality of conductive traces.

2. The inertial measurement unit of claim 1, wherein:

the first, third, and fifth inertial sensors are micro-electromechanical system (MEMS) gyroscopes; and the second, fourth, and six inertial sensors are MEMS accelerometers.

3. The inertial measurement unit of claim 1, wherein:

the first, third, and fifth measurement axes are mutually orthogonal; and the second, fourth, and sixth measurement axes are mutually orthogonal.

* * * * *

UNITED STATES PATENT AND TRADEMARK OFFICE
CERTIFICATE OF CORRECTION

| | | |
|---|---|---|
| PATENT NO. | : 8,100,010 B2 | Page 1 of 1 |
| APPLICATION NO. | : 12/102508 | |
| DATED | : January 24, 2012 | |
| INVENTOR(S) | : Fly et al. | |

It is certified that error appears in the above-identified patent and that said Letters Patent is hereby corrected as shown below:

Column 10, line 19, "six" should be changed to --sixth--.

Signed and Sealed this
Tenth Day of July, 2012

David J. Kappos
*Director of the United States Patent and Trademark Office*